(12) United States Patent
Kurachi et al.

(10) Patent No.: US 6,526,826 B2
(45) Date of Patent: Mar. 4, 2003

(54) ANGULAR SPEED SENSOR DEVICE

(75) Inventors: Hideya Kurachi, Aichi-ken (JP); Manabu Kato, Aichi-ken (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/810,229

(22) Filed: Mar. 19, 2001

(65) Prior Publication Data

US 2001/0029784 A1 Oct. 18, 2001

(30) Foreign Application Priority Data

Mar. 17, 2000 (JP) ...................................... 2000-077093

(51) Int. Cl.$^7$ ............................................... G01P 9/04
(52) U.S. Cl. .................................. 73/504.02; 73/504.14
(58) Field of Search ........................ 73/504.02, 504.04, 73/504.12, 504.14, 504.15, 504.13; 361/280

(56) References Cited

U.S. PATENT DOCUMENTS

| | | | |
|---|---|---|---|
| 5,635,638 A | | 6/1997 | Green ...................... 73/504.04 |
| 5,747,690 A | * | 5/1998 | Park et al. ................ 73/504.12 |
| 6,044,707 A | * | 4/2000 | Kato ........................ 73/504.14 |
| 6,122,962 A | * | 9/2000 | Yoshino et al. ........... 73/504.14 |

FOREIGN PATENT DOCUMENTS

| | | |
|---|---|---|
| JP | 11-83490 | 3/1999 |
| WO | WO 95/34798 | 12/1995 |

* cited by examiner

*Primary Examiner*—Helen Kwok
(74) *Attorney, Agent, or Firm*—Sughrue Mion, PLLC

(57) ABSTRACT

The angular speed sensor device includes a drive frame 11 and a detecting frame 12 which are supported on a silicon substrate 10 in a floating mode. The drive frame 11 and the detecting frame 12 are provided with an angular speed about the z-axis when the drive frame 11 and the detecting frame 12 are driven to vibrate in the x-direction, the resulting Coriolis force causing the detecting frame 12 to oscillate in the y-direction. Such a y-direction oscillation of the detecting frame 12 is detected as a displacement signal. On the basis of the displacement signal, the applied angular speed is calculated. The angular speed sensor device includes detecting electrodes 16a and 16b which drive the detecting frame 12 to vibrate in the y-direction when a drive signal is fed to each of the detecting electrodes 16a and 16b which changes the electrostatic capacitance between the detecting frame 12 and each of the detecting electrodes 16a and 16b. On the basis of the drive signal and the displacement signal which are fed to each of the detecting electrodes 16 and 16b, the resonant frequency of the detecting frame 12 when it is driven to vibrate in the y-direction and the corresponding Q-value are determined.

7 Claims, 13 Drawing Sheets

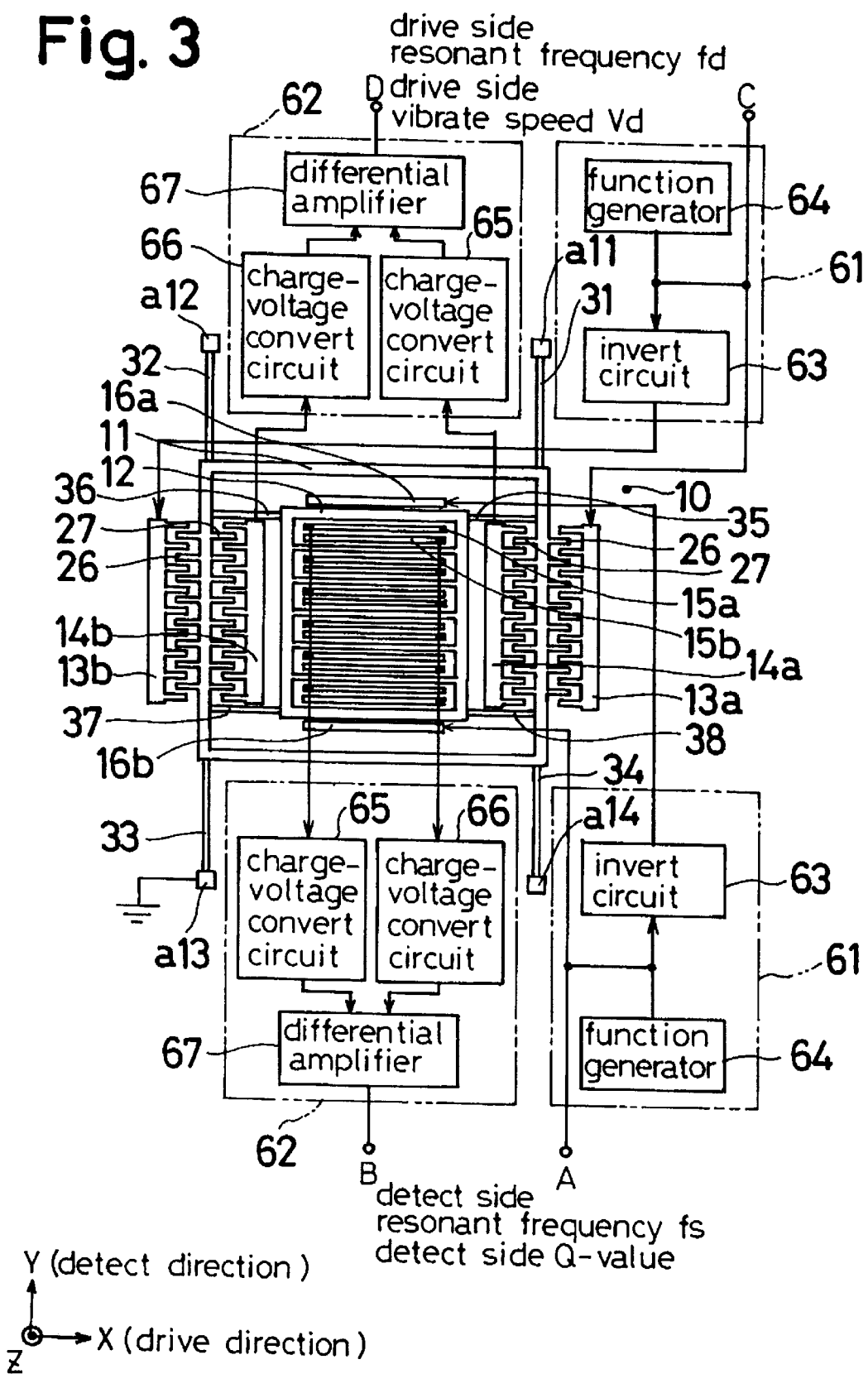

Side of electrode 16a

Side of electrode 16b

Side of electrode 16a

Side of electrode 16b

Side of electrode 16a

Side of electrode 16b

Side of electrode 16a

Side of electrode 16b

Side of electrode 16a

Side of electrode 16b

Side of electrode 16a

Side of electrode 16b

Side of electrode 16a

Side of electrode 16b

Side of electrode 70a

Side of electrode 70b

Side of electrode 70a

Side of electrode 70b

Side of electrode 70a

Side of electrode 70b

Side of electrode 70a

Side of electrode 70b

ANGULAR SPEED SENSOR DEVICE

BACKGROUND OF THE INVENTION

1. Field of the Invention

The present invention is directed to an angular speed sensor device for detecting angular speed on the basis of a vibrated condition of an oscillator which is in a state of floating support on a substrate.

2. Prior Art

Japanese Patent Laid-open Print No. Hei. 11(1999)-83494 discloses a conventional angular speed sensor device of this type. In this angular speed sensor device, if an angular speed about the z-direction is applied to an oscillator while the oscillator is driven to vibrate in the x-direction, the resultant Coriolis force causes the oscillator to vibrate in the y-direction.

Sometimes, due to inevitable different variations of accuracy or precision in different oscillators, the angular speed sensor device sensitivity may vary, which results in the determining or detection precision of the sensor device being lowered. Thus, adjusting the sensor determining precision is required by, for example, adjusting the gain of the detection circuit of the angular speed sensor device.

That is, in the aforementioned sensor device, due to the fact that no device is provided which detects the precision dispersion of the angular speed sensitivity, adjusting the gain of the detection circuit of the angular speed sensor device is made by applying an actual angular speed to the oscillator while the oscillator is being driven to vibrate in the x-direction, resulting in that much time is required for such an adjustment, thereby increasing the production cost of the angular speed sensor device.

Accordingly, there is a need to provide an angular speed sensor device, for overcoming the aforementioned problems, which is capable of determining easily an angular speed device sensitivity and which is capable of adjusting the angular speed sensor device sensitivity.

SUMMARY OF THE INVENTION

A first aspect of the present invention is to provide an angular speed sensor device which comprises:

an oscillator mounted on a substrate in a floating mode and brought into vibration in the y-direction in response to a Coriolis force which results from the oscillator being driven at an angular speed about the z-axis while the oscillator is being driven in the x-direction to be vibrated; detecting means for detecting a y-direction displacement signal of the oscillator; and a detecting electrode device driving the oscillator in the y-direction when a drive signal is applied thereto which varies an electrostatic attraction between the oscillator and the detecting electrode device, wherein a resonant frequency of the oscillator in the y-direction and the corresponding Q-value are determined on the basis of the drive signal and the displacement signal.

A second aspect of the present invention is to provide an angular speed sensor device as a limited version of the first aspect, wherein the detecting electrode device is made up of a first detecting electrode placed at one y-direction side of the oscillator and a seconding detect electrode placed at the other y-direction side of the oscillator.

A third aspect of the present invention is to provide an angular speed sensor device as a limited version of the first aspect, wherein the detecting electrode device is made up of a first detecting electrode and a second detecting electrode which are placed at one y-direction side of the oscillator and which are adjacent each other so as to extend in the x-direction.

A fourth aspect of the present invention is to provide an angular speed sensor device as a limited version of the first aspect, wherein the detecting electrode device is made up of a first detecting electrode and a second detecting electrode which are placed at one y-direction side of the oscillator and which are arranged alternately in the x-direction.

A fifth aspect of the present invention is to provide an angular speed sensor device as a limited version of one of the first, second, third, and fourth aspects, wherein the detecting means includes an angular speed detecting electrode which detects a variable electrostatic capacitance between the oscillator and the angular speed detecting electrode as the displacement signal, a distance in the y-direction between the detecting electrode and the oscillator is set to be shorter than a distance in the y-direction between the angular speed detecting electrode and the oscillator while the oscillator is at rest.

A sixth aspect of the present invention is to provide an angular speed sensor device as a limited version of the second aspect, wherein the detecting means includes first and second angular speed detecting electrodes each of which detects a variable electrostatic capacitance between the oscillator and the angular speed detecting electrode as a displacement signal, the detecting means includes a differential amplifier for differentially amplifying the detected displacement signals.

A seventh aspect of the present invention is to provide an angular speed sensor device as a limited version of any one of the third and the fourths aspects, wherein the detecting means includes first and second angular speed detecting electrodes each of which detects a variable electrostatic capacitance between the oscillator and the angular speed detecting electrode as a displacement signal, the detecting means includes a differential amplifier for differentially amplifying the detected displacement signals.

Operation

If an angular speed $\Omega$ about the z-axis is applied to the drive frame 11 and the detecting frame 12 which are driven to vibrate in the x-direction, depending on the resulting Coriolis force Fc, the detecting frame 12 is vibrated in the y-direction. The displacement $\Delta y$ of the detecting frame 12 in the y-direction which results from the aforementioned Coriolis force Fc can be expressed as formula (1) shown in the Appendix. In formula (1), As and ks [N/m] denote the detect side amplitude expansion rate and the spring constant of the detecting frame 12 in the y-direction, respectively. The elements of formula (2) are also expressed in formulas (2), (3), and (4) which are also in the Appendix. In formula (2), Q is the Q-value when the detecting frame 12 is vibrated in the y-direction at the detecting side resonant frequency fs [Hz]. In the formula (2) ms is the mass of the detecting frame 12. In formula (3), vd [m/s] is the vibration speed (drive vibration speed) in the x-direction of each of the drive frame 11 and the detecting frame 12. It is to be noted that the aforementioned detecting side amplitude expansion rate As is used for obtaining the vibration level at the drive side resonant frequency fd [Hz] in correspondence to the vibration level at which the Q-value is determined while the detecting frame 12 is in vibration at the detecting side resonant frequency fs [Hz] becomes Q. If formulas (2) to (4) inclusive are substituted into formula (1), the displacement $\Delta y$ can be expressed in formula (5) which is shown in the Appendix.

Thus, substituting the detected drive side resonant frequency fd [Hz], the drive vibration speed vd [m/s], and the corresponding Q-value into formula (5) makes it possible to previously verify the slope of the displacement Δy of the detecting frame 12 in the y-direction relative to the angular speed Ω (i.e., the angular speed sensor device sensitivity).

In accordance with the first aspect of the present invention, the angular speed sensor device includes the detecting electrode device which drives the oscillator the y-direction when the drive signal is applied thereto which varies the electrostatic attraction between the oscillator and the detecting electrode device. On the basis of the drive signal and the displacement signal which are applied to the detecting electrode device, the y-direction resonant frequency of the oscillator and the resultant Q-value are determined. Thus, the slope of the y-direction displacement Δy of the oscillator relative to the angular speed, i.e., the angular speed sensor device sensitivity, can be easily confirmed, which results in that on the basis of the resultant sensitivity adjusting the sensitivity can be made easily, without application of angular speed, by gain adjustment of the detection circuit of the sensor device. Therefore, the time required for the adjustment of the sensor sensitivity can be reduced, thereby lowering the production cost.

In accordance with the second aspect of the present invention, the detecting electrode device is made up of the first detecting electrode placed at one y-direction side of the oscillator and the second detecting electrode placed at the other y-direction side of the oscillator. Thus, when the oscillator is driven for oscillation in the y-direction by applying the drive signals whose phases are in opposition and the same dc biases to each of the first detecting electrode and the second detecting electrode, the resultant noise superposed on the displacement signal can be reduced, whereby the y-direction resonant frequency of the oscillator (the detecting side resonant frequency) and the resultant Q-value, i.e., can be determined with higher accuracy.

In accordance with the third aspect of the present invention, the detecting electrode device is made up of the first detecting electrode and the second detecting electrode which are placed at one y-direction side of the oscillator and which are adjacent each other so as to extend in the x-direction. Thus, when the oscillator is driven for oscillation in the y-direction by applying the drive signals whose phases are in opposition and the opposite signed dc biases to each of the first detecting electrode and the second detecting electrode, the resultant noise superposed on the displacement signal can be reduced, whereby the y-direction resonant frequency of the oscillator (the detecting side resonant frequency) and the resultant Q-value, i.e., can be determined with higher accuracy.

In accordance with the fourth aspect of the present invention, the detecting electrode device is made up of the first detecting electrode and the second detecting electrode which are placed at one y-direction side of the oscillator and which are arranged alternately in the x-direction. Thus, when the oscillator is driven for oscillation in the y-direction by applying the drive signals whose phases are in opposition and the opposite signed dc biases to each of the first detecting electrode and the second detecting electrode, the resultant noise superposed on the displacement signal can be reduced, whereby the y-direction resonant frequency of the oscillator (the detecting side resonant frequency) and the resultant Q-value, i.e., can be determined with higher accuracy.

In accordance with the fifth aspect of the present invention, when the oscillator is at rest, the y-direction distance between the oscillator and the detecting electrode is set to be shorter than the distance between the angular speed detecting electrode and the oscillator. Thus, upon detection of the angular speed, maintaining the oscillator and the detecting electrode at the same potential levels makes it possible to engage the oscillator with detecting electrode before oscillator is brought into engagement with the angular speed detecting electrode if the oscillator vibrates in excess in the y-direction by e.g., an external shock. Thus, such a regulation of the vibration of the oscillator makes it possible to prevent a short circuit between the oscillator and the angular speed detecting electrode and to regulate the amplitude which results in the prevention of the breakage of the oscillator per se.

In accordance with the sixth aspect of the present invention, for example, when the same dc biases and the drive signals which are of opposite phases are fed to both of the first and second detecting electrodes, the noises superposed from the drive signals on the displacement signals detected by the first and second angular speed detecting electrodes, respectively, are canceled with each other at the differential amplifier, whereby the y-direction resonant frequency of the oscillator (the detecting side resonant frequency) and the resultant Q-value, i.e., can be determined with higher accuracy.

In accordance with the seventh aspect of the present invention, when the opposite signed dc biases and the drive signals which are of opposite phases are fed to both of the first and second detecting electrodes, the noises superposed from the drive signals on the displacement signals detected by the first and second angular speed detecting electrodes, respectively, are canceled with each other at the differential amplifier, whereby the y-direction resonant frequency of the oscillator (the detecting side resonant frequency) and the resultant Q-value, i.e., can be determined with higher accuracy.

BRIEF DESCRIPTION OF THE DRAWINGS

The above and other objects, features and advantages of the present invention will be more apparent and more readily appreciated from the following detailed description of preferred exemplary embodiments of the present invention, taken in connection with the accompanying drawings, in which;

FIG. 3 illustrates an outline mode as to how to detect a detecting side resonant frequency and the corresponding Q-value in the first embodiment;

DETAILED DESCRIPTION OF THE PRESENT INVENTION

First Embodiment

A first embodiment of an angular speed sensor device in accordance with the present invention will be described with reference to FIGS. 1 to 10 inclusive.

Figure 1:
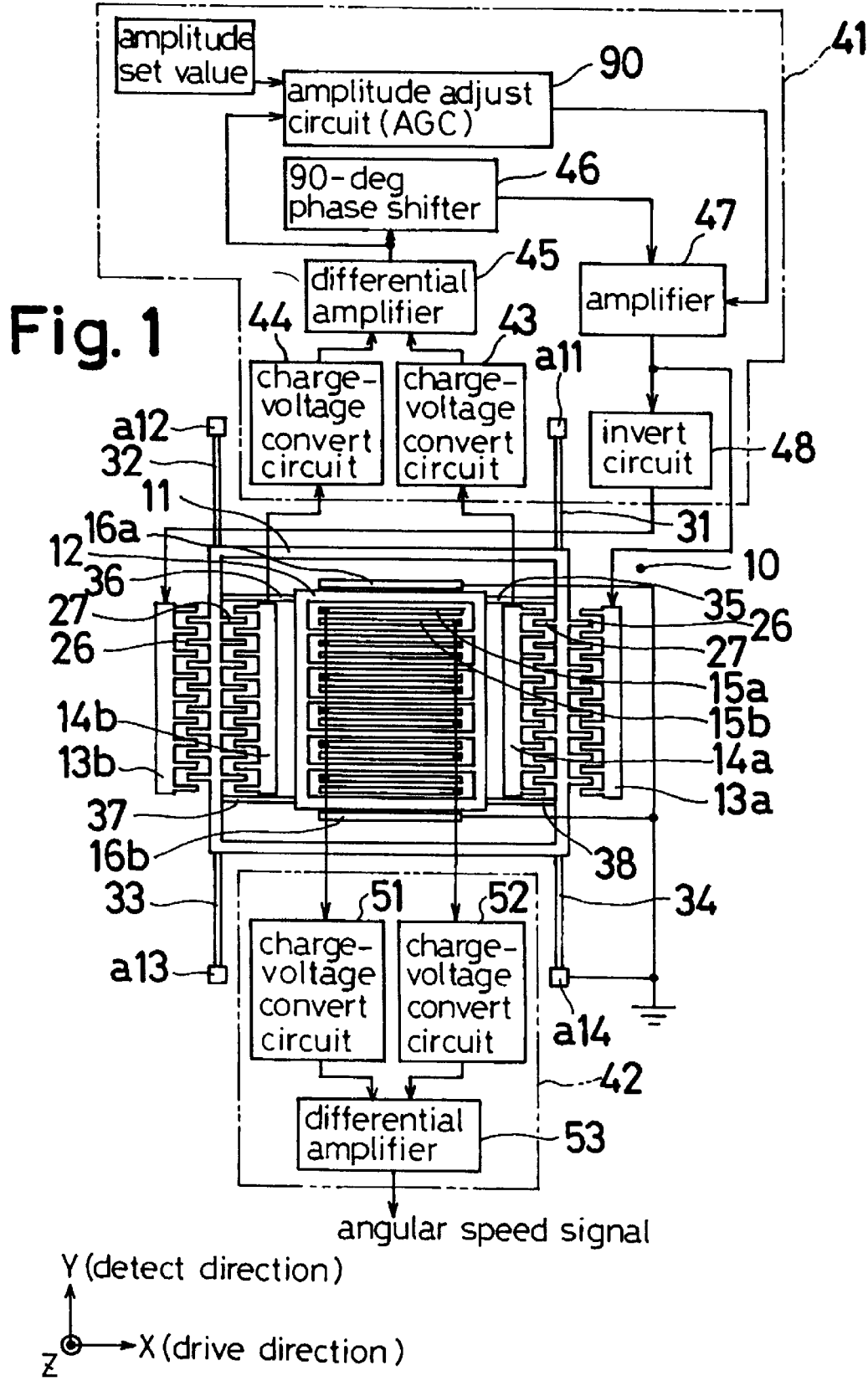
FIG. 1 illustrates a block diagram of a first embodiment of an angular speed sensor device in accordance with the present invention.

As shown in FIG. 1, on a silicon substrate 10, which constitutes an isolation layer base member, there are provided or mounted a drive frame 11 which is formed of conductive poly-silicon, a detection frame 12 which acts as an oscillator, a pair of drive electrodes 13a and 13b, a pair of drive detection electrodes 14a and 14b, a pair of angular speed detection electrodes 15a and 15b, a first determining electrode 16a, a second determining electrode 16b, and floating anchors a11, a12, a13, and a14. It is to be noted the electrodes 13a, 13b, 14a, 14b, 15a, 15b, 16a, and 16b and the floating anchors a11, a12, a13, and a14 are secured to the silicon substrate 10.

The drive frame 11 is in the form of a substantially square frame or a substantially square loop structure. At each of the right and left sides in FIG. 1 of the drive frame 11 which extends in the y-direction, there are formed a plurality of regularly spaced drive side movable electrodes 26 which constitute as a whole a comb-like electrode device. Each of the electrodes 26 extends outwardly in the x-direction. Similarly, there are formed a plurality of regularly spaced drive detection side movable electrodes 27 which constitute as a whole a comb-like electrode device. Each of the electrodes 27 extends inwardly in the x-direction. An electrostatic attraction force between each of the drive side electrodes 26 and the drive side electrodes 13a, 13b varies periodically or at a cycle when a drive signal is fed to the drive side electrodes 13a, 13b, which causes the drive frame 11 to vibrate in the x-direction. In addition, the electrode 27 detects such a vibration on the basis of a capacitance variation between the drive detection electrodes 14a and 14b which results from the variation.

For increasing the flexibility in the x-direction, the four corners of the drive frame 11 are connected to the floating anchors a11, a12, a13, and 14 by way of conductive silicon spring beams 31, 32, 33 and 34, respectively, which extends outwardly in the y-direction. The drive frame 11 and the spring beams 31, 32, 33, and 34 can float relative to the silicon substrate 11 through a lithographic semiconductor manufacturing process. The spring beams 31, 32, 33, and 34 are the same in both width and length.

The detection frame 12 is similar to the drive frame 11 in shape but is made smaller than the drive frame 11 in both width and length. An inner space of the detection frame 12 is divided, by the x-direction bridging beams into a plurality of spaces, e.g., six spaces, each having the same area and which are arranged in the y-direction. For increasing the flexibility in the y-direction, four corners of the detection frame 12 are connected to the drive frame 11 by way of conductive silicon spring beams 35, 36, 37, and 38, which extend outwardly in the x-direction, respectively. The detection frame 12 and the spring beams 35, 36, 37, and 38 can float relative to the silicon substrate 10 through a lithographic semiconductor manufacturing process. The spring beams 35, 36, 37, and 38 are the same in both width and length.

The drive electrodes 13a and 13b are placed outwardly of the drive frame 11 and extend along the y-direction. Each of the drive electrodes 13a and 13b is formed into a comb-like drive side stationary electrode which is disposed in an interdigitated relation with the corresponding drive side movable electrode 26. Applying the driving signal voltage to each of the drive electrodes 13a and 13b causes the electrostatic force between the drive side movable electrode 26 and each of the drive electrodes 13a and 13b to change periodically in a cycle, thereby vibrating the drive frame 11 in the x-direction. Due to the fact that the detection frame 12 is connected to the drive frame 11 by way of the spring beams 35, 36, 37, and 38, the detection frame 12 is also brought into the x-direction vibration together with the x-direction of the drive frame 11. The drive frame 11 and the detection frame 12 are excited at their resonant frequency in the x-direction upon the aforementioned application of the drive voltage. If an angular speed in the z-direction is applied to the detection frame 12 while the detection frame 12 is vibrated in the x-direction together with the drive frame 11, the resultant Coriolis force causes the detection frame 12 to follow an elliptical vibration which has a vibration component in the y-direction.

The drive detecting electrodes 14a and 14b are so placed inside the drive frame 11 as to extend along the y-direction. Each of the drive detection electrodes 14a and 14b is formed into a comb-like drive detection side stationary electrode which is interdigitated with the corresponding drive detection side movable electrode 27. The drive detection electrodes 14a and 14b detect an x-direction vibration condition of the drive frame 11 on the basis of the electrostatic capacitance between each of the drive detection electrodes 14a and 14b and the drive frame 11 which is in vibration in the x-direction. In detail, when the drive frame 11 is moved in one direction, such as the right direction as shown in FIG. 1, the electrostatic capacitance between the drive detection electrode 14a and the drive detection side movable electrode 27 is decreased and simultaneously the electrostatic capacitance between the drive detection electrode 14b and the drive detection side movable electrode 27 is increased. When the drive frame 11 is moved in the other direction, i.e., the left direction as shown in FIG. 1, opposite conditions occur. Thus, the electrostatic capacity vibrations at the drive detection electrodes 14a and 14b are opposite to each other in phase.

Figure 2:
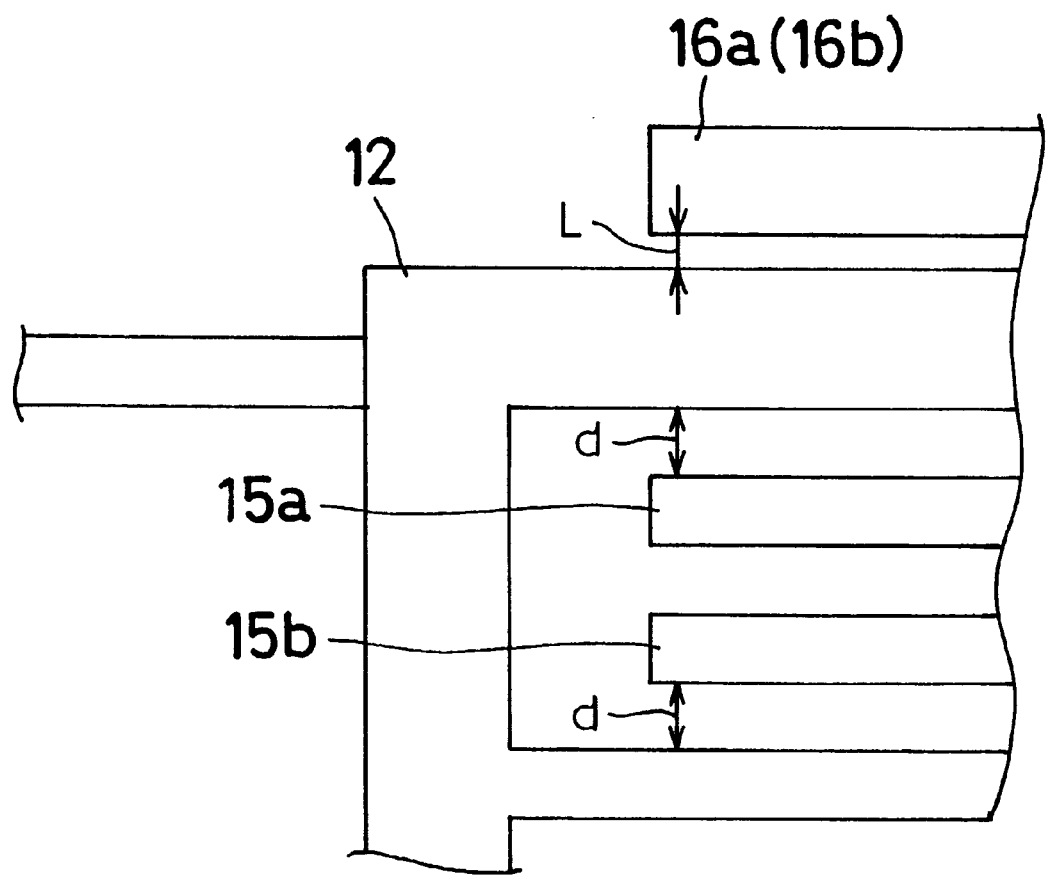
FIG. 2 illustrates an enlarged view of a part of the angular speed sensor device shown in FIG. 1.

The angular speed detection electrodes 15a and 15b are placed in each of spaces defined by the bridge beams such that the distance d as shown in FIG. 2 is set between each of the angular speed detection electrodes 15a and 15b and the corresponding bridge beam when the detection frame 12 is at rest. The angular speed detection electrodes 15a and 15b detect a y-direction vibration condition of the detection frame 12 on the basis of an electrostatic oscillation between the detection frame 12 and each of the angular speed detection electrodes 15a and 15b. In detail, when the detection frame 12 is moved in one direction, such as an upper direction as shown in FIG. 1, the electrostatic capacitance between the detection frame 12 and the angular speed detection electrode 15a is decreased and simultaneously the electrostatic capacitance between the detection frame 12 and the angular speed detection electrode 15b is decreased. When the detection frame 12 is moved in the other direction, i.e., the downward direction as shown in FIG. 1, opposite conditions occur. Thus, the electrostatic vibrations at the angular speed detection electrodes 15a and 15b are opposite to each other in phase.

The y-direction vibration condition of the detection frame 12 while the detection frame 12 is in motion in the x-direction together with the drive frame 11 makes it possible to determine an angular speed about the z-direction.

The first detecting electrode 16a and the second detecting electrode 16b are placed outside the upper side and the lower side of the detection frame 12, respectively, as shown in FIG. 1, in such a manner that the first detecting electrode 16a and the second detecting electrode 16b extend in the x-direction. A distance L, which is shorter than the distance d, is set between the detection frame 12 which is at rest and each of the first detecting electrode 16a and the second detecting electrode 16b. Thus, even if the detection frame 12 is vibrated in y-direction excessively due to e.g., external shock, the detection frame 12 is brought into engagement with either of the first detecting electrode 16a and the second detecting electrode 16b before engagement of the detection frame 12 with the angular speed detection electrodes 15a and 15b. The first detecting electrode 16a and the second detecting electrode 16b are designed to excite the detection frame 12 in the y-direction in a mode as will be detailed later for obtaining a y-direction resonant frequency and Q-value of the detection frame 12.

Next, an electrical structure or circuit diagram of the angular speed sensor device will be detailed.

As can be seen from FIG. 1, the angular speed sensor device includes a drive circuit portion 41 and a detection circuit portion 42.

The drive circuit portion 41 is made up of charge-voltage converting circuits 43 and 44, a differential amplifier 45, a phase shifter 46, amplifier 47, and an inverting circuit 48 and drives the drive frame 11 to vibrate at the drive side resonant frequency.

The charge-voltage converting circuits 43 and 44 are connected to the drive detection electrodes 14a and 14b, respectively, to generate voltage signals which correspond to the electrostatic capacitance oscillations which occur between the drive detection side movable electrodes 27 and the drive detection electrodes 14a and 14b. Each of these voltage signals is an AC signal which is indicative of the level of change in synchronization with the x-direction vibration of the drive frame 11 and the detection frame 12. Due to the fact that the electrostatic capacitance oscillations at the respective drive detection electrodes 14a and 14b are mutually negative phase signals, the signals outputted from the respective charge-voltage converting circuits 43 and 44 are also mutually negative phase signals.

The differential amplifier 45 is connected to the charge-voltage converting circuits 43 and 44 for differentially amplifying the mutually negative phase signals outputted therefrom, thereby generating a differentially amplified signal as an in-phase noise canceled signal.

The phase shifter 46 connected to the differential amplifier 45 shifts the phase of the differentially amplified signal generated at the differential amplifier by about $\pi/2$ in order to make the phase of the loop $2n\pi$ (n: an integer) which is established by the electrodes 13a, 13b, 14a, and 14b, the drive circuit portion 41, and others.

The amplifier 47 is connected to the phase shifter and amplifies the differentially amplified phase-shifted signal such that a loop gain is made larger than 1 which is formed by the electrodes 13a, 13b, 14a, 14b, the drive circuit portion 41, and others.

The drive electrode 13a is supplied with the amplified voltage signal outputted from the amplifier 47 as it is, while the drive electrode 13b is supplied with a phase-inverted amplified signal which is obtained by the inverting circuit 48.

The drive circuit portion 41 having the aforementioned circuit diagram or structure drives the drive frame 11 and the detecting frame 12 to vibrate in the x-direction at the drive side resonant frequency fd [Hz]. It is to be noted that at this time the amplitude and drive vibration speed vd of each of the drive plate 11 and the detecting frame 12 are adjusted to be predetermined values, respectively, at an amplitude set circuit (AGC circuit) 90.

The detecting circuit portion 42, which detects the applied angular speed about the z-axis, includes charge-voltage converter circuits 51 and 52 and a differential amplifier 53.

The charge-voltage converter circuits 51 and 52 are connected to the respective angular speed detect electrodes 15a and 15b and output electric signals which correspond to electric capacitance oscillations between the whole detecting frame 12 at GND level and the respective angular speed detecting electrodes 15a and 15b. Each of these signals is an AC signal which is indicative of the level of change in synchronization with y-direction vibration of the detection frame 12. Due to the fact that the electrostatic capacitance oscillations at the respective angular speed detection electrodes 15a and 15b are mutually negative phase signals, the signals outputted from the respective charge-voltage converting circuits 51 and 52 are also mutually negative phase signals.

The differential amplifier 53 is connected to the charge-voltage converting circuits 51 and 52 for differentially amplifying the mutually negative phase signals outputted therefrom, thereby generating a differentially amplified signal as an in-phase noise canceled signal.

If an angular speed about the z-axis is applied to the detecting frame 12 which is being vibrated in the x-direction together with the drive frame 11, as explained above, the detecting frame 12 vibrates in the y-direction. The resultant angular speed signal has a fixed relation to the applied angular speed. Thus, the angular speed signal makes it possible to indicate the applied angular speed.

It is to be noted that the first detecting electrode 16a and the second detecting electrode 16b are grounded together with the drive frame 11 and the detecting frame 12 so as to be at the same potential level as the detecting frame 12.

As shown in FIG. 3, the detection device is made up of a drive circuit portion 61 and a detecting circuit portion 62.

The drive circuit portion 61 has a function generator 64 and an inverting circuit 63 and applies a drive signal to each of the first detecting electrode 16a and the second detecting electrode 16b, respectively, for determining the y-direction resonant frequency (i.e., detection side resonant frequency) fs [Hz] of the detecting frame 12 in such a manner that the frequency of the drive signal is changed.

Figure 4A:
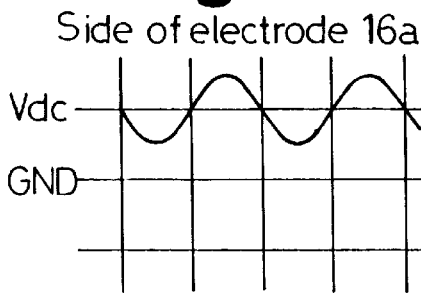
FIGS. 4a and 4b illustrate waveforms of drive signals to be fed to detecting electrodes, respectively.
Figure 4B:
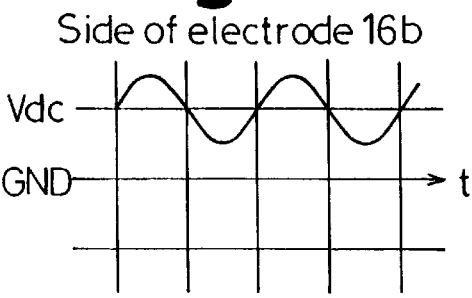

In detail, the function generator 64 issues a drive signal and applies the same as it is to the second detecting electrode 16b while changing the frequency of the drive signal. On the other hand, the function generator 64 issues a drive signal and applies the same after phase inversion by the inverting circuit 634 to the first detecting electrode 16a. As shown in FIG. 4, the first detecting electrode 16a is applied with a set of DC and AC voltages which are indicated by Vdci+−Vacsin (2πft+π)[V], while the second detecting electrode 16b is applied with a set of DC and AC voltages which are indicated by Vdc+Vacsin (2πft) [V], where Vdc, Vac, and f are DC voltage, AC voltage with constant amplitude and detected resonant frequency, respectively.

The drive circuit portion 61 having the aforementioned electrical structure drives the detecting frame 12 in the y-direction to vibrate at a frequency of f. It is to be noted that the drive signal which is outputted or issued from the function generator 64 can be watched at a terminal A.

The detecting circuit portion 62, which detects the vibration condition of the detecting frame 12 in the y-direction, includes charge-voltage converter circuits 65 and 66 and a differential amplifier 67.

The charge-voltage converter circuits 65 and 66 are connected to the respective angular speed detecting electrodes 15a and 15b and output electric signals which correspond to electric capacitance oscillations between the detecting frame 12 at GND level and the respective angular speed detecting electrodes 15a and 15b. Each of these signals is an AC signal which is indicative of the level of change in synchronization with the y-direction vibration of the detection frame 12. Due to the fact that the electrostatic capacitance oscillations at the respective angular speed detection electrodes 15a and 15b are mutually negative phase signals, the signals outputted from the respective charge-voltage converting circuits 65 and 66 are also of mutually negative phase signals.

The differential amplifier 67 is connected to the charge-voltage converting circuits 65 and 66 for differentially amplifying the mutually negative phase signals outputted therefrom. The differential amplifier 67 issues, for example, a differentially amplified signal in which in-phase noises are canceled which are superposed on the respective angular speed detecting electrodes 15a and 15b resulting from applying the drive signals to the respective first detecting electrode 16a and the second detecting electrode 16b. Such a differentially amplified signal can be watched at terminal B.

At this stage, measuring the frequency when a phase difference of π/2 appears between signals at the respective terminals A and B and measuring a voltage across the terminals A and B make it possible to obtain the detection side resonant frequency fs [Hz] and its corresponding Q-value.

As shown in FIG. 3, after connecting the drive electrodes 13a and 13b to the drive detect electrodes 14a and 14b by way of a similar device made up of a drive circuit portion 61 and a detecting circuit portion 62, measuring the frequency when a phase difference of π/2 appears between signals at the respective terminals C and D and measuring a voltage across the terminals A and B make it possible to obtain the drive side resonant frequency fd [Hz] and amplitude (drive vibration speed vd) of each of the drive frame 11 and the detecting frame 12.

The following describes a calculation mode of the angular speed sensor device sensitivity on the basis of the aforementioned detecting side resonant frequency fs [Hz] and the corresponding Q-value.

If an angular speed Ω about the z-axis is applied to the drive frame 11 and the detecting frame 12 which are driven to vibrate in the x-direction, depending on the resulting Coriolis force Fc, the detecting frame 12 is vibrated in the y-direction. The displacement Δy of the detecting frame 12 in the y-direction which results from the aforementioned Coriolis force Fc can be expressed as formula (1) shown in the Appendix. In formula (1), As and ks [N/m] denote the detecting side amplitude expansion rate and the spring constant of the detecting frame 12 in the y-direction, respectively. The elements of formula (2) are also expressed in formulas (2), (3), and (4) which are also in the Appendix. In formula (2), Q is the Q-value when the detecting frame 12 is vibrated in the y-direction at the detecting side resonant frequency fs [Hz]. In formula (2), ms is the mass of the detecting frame 12. In formula (3), vd [m/s] is the vibration speed in the x-direction of the drive frame 11 and the detecting frame 12. It is to be noted that in the aforementioned, the detecting side amplitude expansion rate As is used for obtaining the vibration level at the drive side resonant frequency fd [Hz] in correspondence to the vibration level at which the Q-value, while the detecting frame 12 is in vibration at the detect side resonant frequency fs [Hz], becomes Q. If formulas (2) to (4) inclusive are substituted into formula (1), the displacement Δy can be expressed in the formula (5) which is shown in the Appendix.

Thus, substituting the detection drive side resonant frequency fd [Hz], the drive vibration speed vd [m/s], and the corresponding Q-value into formula (5) makes it possible to previously verify the slope of the displacement Δy of the detecting frame 12 in the y-direction relative to the angular speed Ω (i.e., the angular speed sensor device sensitivity).

It is to be noted that the drive frame 11 and the detecting frame 12 are assumed to vibrate in the x-direction accurately according to the set amplitude value, without detecting the drive vibration amplitude, the angular speed sensor device sensitivity can be calculated on the basis of the calculated drive vibration amplitude Vd [m/s] by using the set drive side amplitude and the detected drive resonant frequency fd.

As apparent from the aforementioned detailed disclosure, the present embodiment can provide the following advantages or merits.

(1) In the present embodiment, the first detecting electrode 16a and the second detecting electrode 16b are provided for obtaining the detecting side resonant frequency fs [Hz] and the corresponding Q-value. On the basis of the detecting side resonant frequency fs [Hz] and the corresponding Q-value, the slope of the displacement Δy of the detecting frame 12 in the y-direction relative to the angular speed Ω (i.e., the angular speed sensor device sensitivity) can be confirmed in advance easily. Thus, without applying an angular speed, on the basis of the confirmed angular speed sensitivity, adjusting sensitivity is made, for example, by gain adjustment of the sensor detection circuit. In addition, applying an angular speed is not required, which makes it possible to make the production line automated, thereby reducing the time required for the angular speed sensitivity adjustment, resulting in cost reduction.

(2) In the present embodiment, on the upper side and lower side in FIG. 1 of the detecting frame 12, there are provided the first detecting electrode 16a and the second detecting electrode 16b, respectively, such that the detecting frame 12 is roughly interposed therebetween. The drive signals which are the same in DC bias but which are opposite in phase are fed to the first detecting electrode 16a and the second detecting electrode 16b, thereby driving the detecting frame 12 to vibrate in the y-direction. Thus, the differential amplifier 67 cancels the noises superposed on the respective angular speed detecting electrodes 15a and 15b which result from applying the driving signals to the respective first detecting electrode 16a and the second detecting electrode 16b. Thus, detecting the detecting side resonant frequency fs [Hz] and the corresponding Q-value (i.e., the angular speed sensor device sensitivity) can be made with much higher precision.

(3) In the present embodiment, while the detecting frame 12 is at rest, the y-direction distance L between the detecting frame 12 and each of the first detecting electrode 16a and the second detecting electrode 16b is set to be larger than the y-direction distance d between the detecting frame 12 and each of the angular speed detecting electrodes 15a and 15b. Thus, upon detection of the angular speed, maintaining the detecting frame 12 and the electrodes 16a and 16b at a same potential voltage makes it possible to establish an earlier engagement of the detecting frame 12 with each of the electrodes 16a and 16b than an engagement of the detecting frame 12 with each of the electrodes 15a and 15b, if the detecting frame 12 vibrates in excess due to e.g., an external shock. Thus, regulating such an excess vibration of the detecting frame 12 can prevent breakage of the detecting frame 12 per se and a short-circuit between the detecting frame 12 and each of the angular speed detecting electrodes 15a and 15b.

Figure 5A:
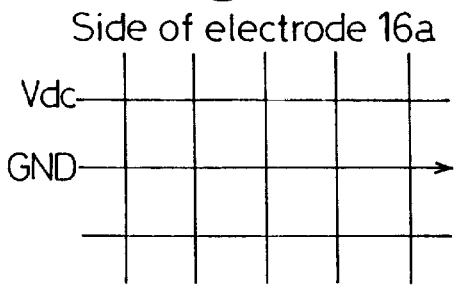
FIGS. 5a and 5b illustrate alternate waveforms of the drive signals to be fed to the detecting electrodes, respectively.
Figure 5B:
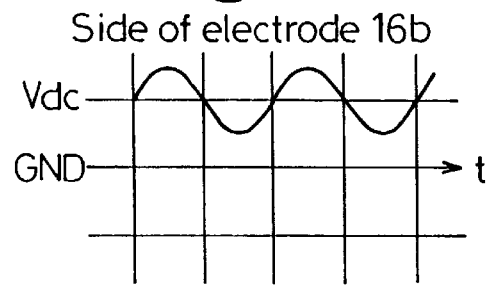

As can be seen from FIG. 5a, the signal to be applied to the first detecting electrode 16a can be a DC signal having a voltage of Vdc [V] and, as seen from FIG. 5b, the signal to be applied to the second detecting electrode 16b can be a set of a set of DC and AC voltages which is indicated by Vdc+Vacsin (2πft+π) [V]. In this case, the differential amplifier 47 deletes noises which are superposed on the angular speed detect electrodes 15a and 15b resulting from the drive signal applied to the first detecting electrode 15a and the second detecting electrode 15b. And, similarly, detecting the frequency when the phase difference between signals at the respective terminals A and B makes it possible to detect the detection side resonant frequency fs [Hz] and the corresponding Q-value.

Figure 6A:
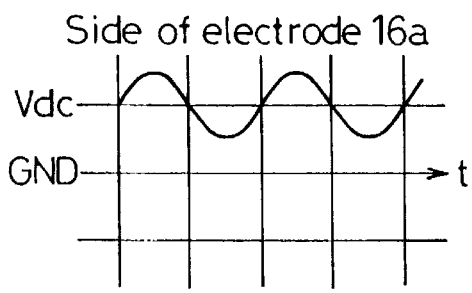
FIGS. 6a and 6b illustrate alternate waveforms of the drive signals to be fed to the detecting electrodes, respectively.
Figure 6B:
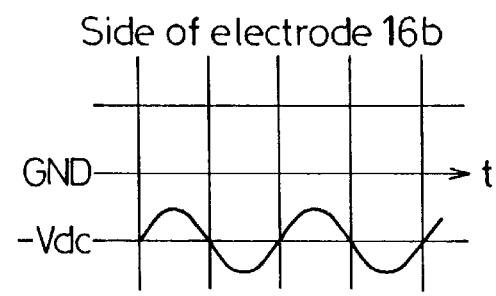

As can be seen from FIG. 6a, the signal to be applied to the first detecting electrode 16a can be a set of DC and AC voltages which is indicated by Vdc+Vacsin (2πft)[V] and, as seen from FIG. 6b, the signal to be applied to the second detecting electrode 16b can be a combination of DC and AC voltages which is indicated by −Vdc+Vacsin (2πft) [V]. In this case, the differential amplifier 47 deletes noises which are superposed on the angular speed detecting electrodes 15a and 15b resulting from the drive signal applied to the first detecting electrode 15a and the second detecting electrode 15b. And, similarly, detecting the frequency when the phase difference between signals at the respective terminals A and B makes it possible to detect the detection side resonant frequency fs [Hz] and the corresponding Q-value.

Figure 7A:
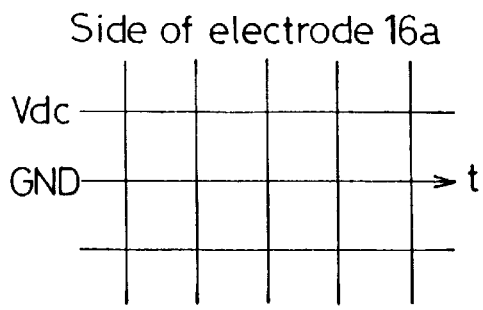
FIGS. 7a and 7b illustrate alternate waveforms of the drive signals to be fed to the detecting electrodes, respectively.
Figure 7B:
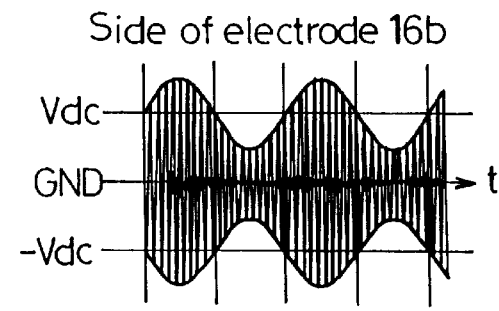

Further, as can be seen from FIG. 7a, the signal to be applied to the first detecting electrode 16a can be a DC signal having a voltage of Vdc [V] and the signal to be applied to the second detect electrode 16b can be an AC voltage which results from an AM modulation of a DC voltage and a high frequency AC voltage at a vicinity of a resonant point and which is indicated by Vdc+Vaccos (2πft+θ1+π) Vacsin (2πfht+θ2)[V], where f is the modulated frequency, fh is the frequency of a carrier wave (high frequency wave), θ1 is a given constant, and θ2 is a given constant. In this case, deleting high frequency noises superposed on the respective angular detecting electrodes 15a and 15b with a low pass filter makes it possible to detect, with higher accuracy, the detection side resonant frequency fs [Hz] and the corresponding Q-value.

Figure 8A:
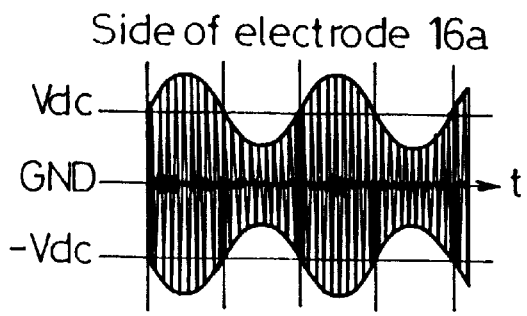
FIGS. 8a and 8b illustrate alternate waveforms of the drive signals to be fed to the detecting electrodes, respectively.
Figure 8B:
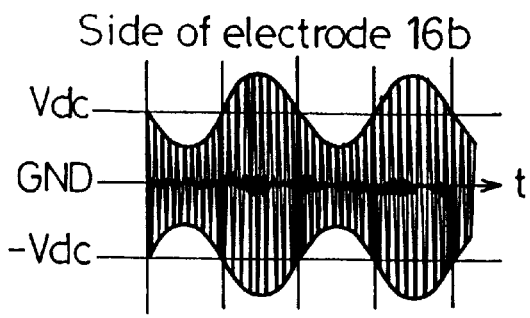

Further, as can be seen from FIG. 8a, the signal to be applied to the first detecting electrode 16a can be an AC voltage which results from an AM modulation of a DC voltage and a high frequency AC voltage at a vicinity of resonant point and which is indicated by Vdc+Vaccos (2πft+θ1+π) Vacsin (2πfht+θ2)[V] and, as can be seen from FIG. 8b, the signal to be applied to the second detecting electrode 16b can be an AC voltage which results from an AM modulation of a DC voltage and a high frequency AC voltage at a vicinity of a resonant point and which is indicated by Vdc+Vaccos (2πft+θ1+π) Vacsin (2πfht+θ3) [V], where f is the modulated frequency, fh is the frequency of carrier wave (high frequency wave), θ1 is a given constant, θ2 is a given constant, and θ3 is a given constant. In this case, deleting high frequency noises superposed on the respective angular detecting electrodes 15a and 15b with a low pass filter makes it possible to detect, with higher accuracy, the detection side resonant frequency fs [Hz] and the corresponding Q-value.

Figure 9A:
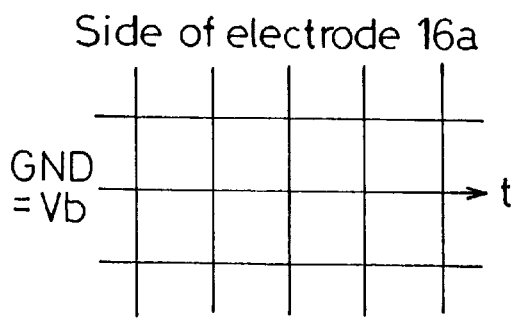
FIGS. 9a and 9b illustrate alternate waveforms of the drive signals to be fed to the detecting electrodes, respectively.
Figure 9B:
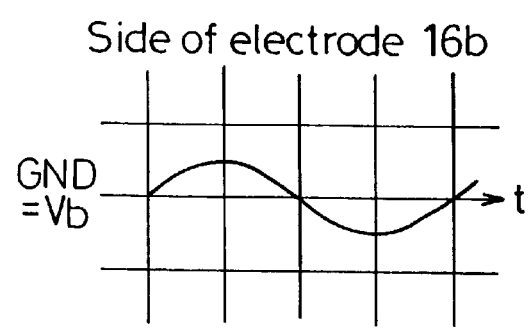

As can be seen from FIG. 9a, the signal to be applied to the first detecting electrode 16a can be a DC signal having a voltage of Vb [V] and the signal to be applied to the second detecting electrode 16b can be a combination of DC voltage and an AC voltage having half of a forecasted detection resonant frequency which is indicated by Vb+Vasin (2π(1/2)ft) [V], where f is the forecasted detection frequency and Vb is a DC voltage having the same potential as the detecting frame 12. In this case, deleting high frequency noises superposed on the respective angular detecting electrodes 15a and 15b with a low pass filter makes it possible to detect, with higher accuracy, the detecting side resonant frequency fs [Hz] and the corresponding Q-value.

Figure 10A:
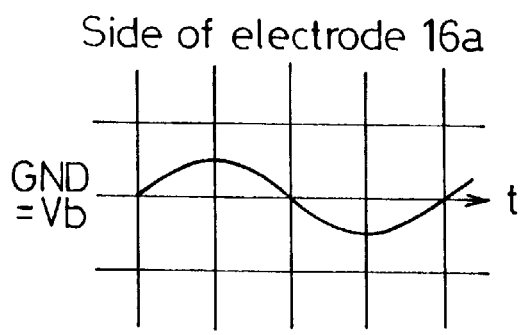
FIGS. 10a and 10b illustrate alternate waveforms of the drive signals to be fed to the detecting electrodes, respectively.
Figure 10B:
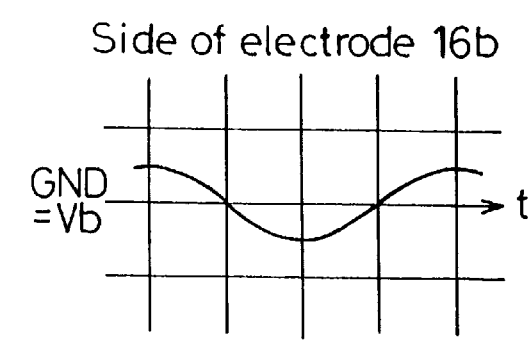

As can be seen from FIG. 10a, the signal to be applied to the first detecting electrode 16a can be a set of DC voltage and an AC voltage having half of a forecasted detection resonant frequency which is indicated by Vb+Vasin (2π(1/2)ft ) [V] and, as seen from FIG. 10b, the signal to be applied to the second detecting electrode 16b can be a combination of DC voltage and an AC voltage having half of a forecasted detection resonant frequency which is indicated by Vb+Vasin (2π(1/2)ft+π/2) [V]. In this case, detecting high frequency noises superposed on the respective angular detecting electrodes 15a and 15b with a low pass filter makes it possible to detect, with higher accuracy, the detecting side resonant frequency fs [Hz] and the corresponding Q-value.

[Second Embodiment]

An angular speed sensor device according to a second embodiment of the present invention will be explained with reference to FIGS. 11 to 15 inclusive. The angular speed sensor device according to the second embodiment is identical, in principle, with the angular speed sensor device according to the first embodiment. However, instead of the first detecting electrode 16a and the second detecting electrode 16b between which the detecting frame 12 is placed, in the second embodiment, a first detecting electrode 70a and a second detecting electrode 70b, which are in alignment with each other in x-direction, are placed at the upper side, as shown in FIG. 11, of the detecting frame 12.

Figure 11:
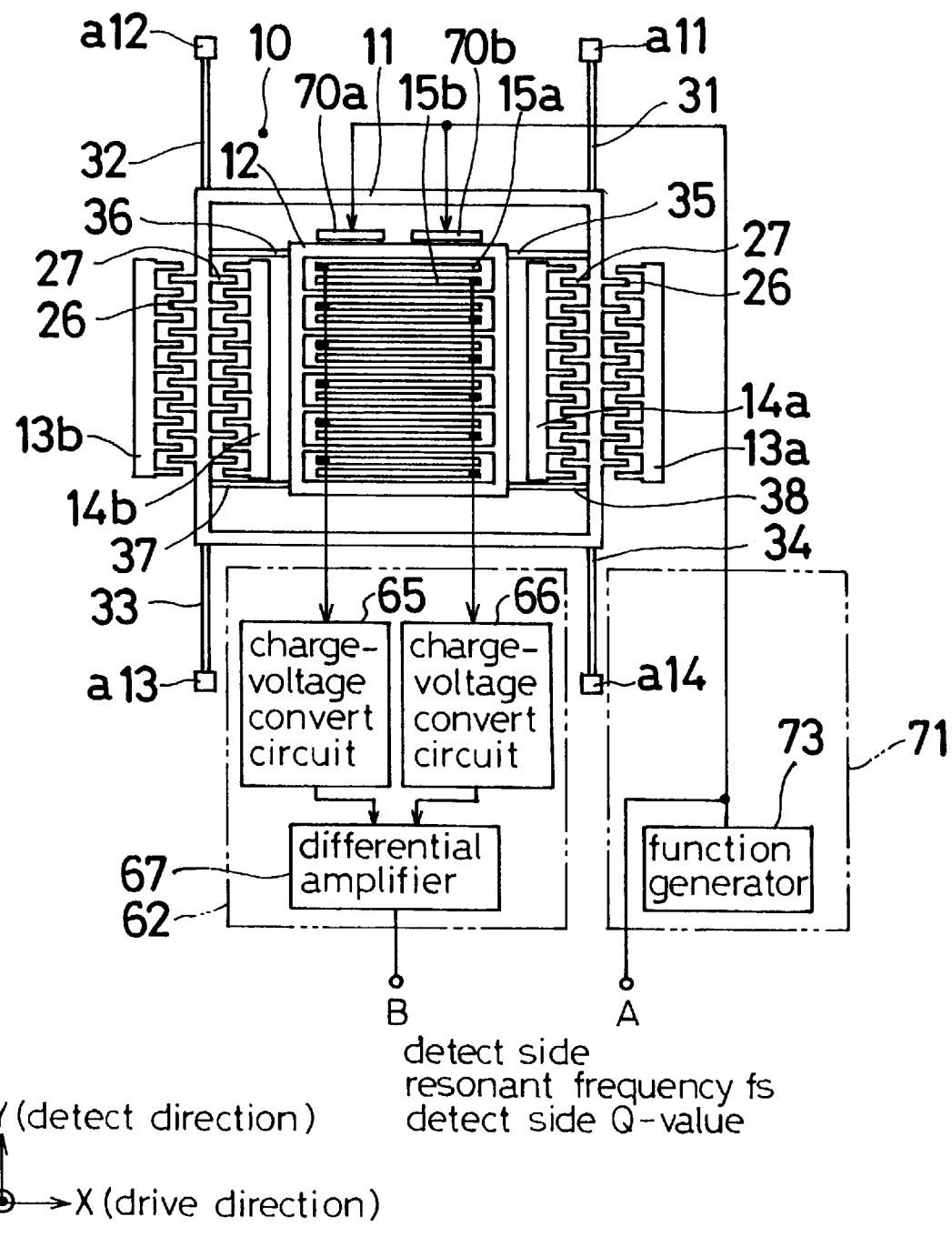
FIG. 11 illustrates a block diagram of a second embodiment of an angular speed sensor device in accordance with the present invention with an outline mode as to how to detect a detecting side resonant frequency and the corresponding Q-valee in the second embodiment.

Referring to FIG. 11, an electrical structure for detecting the sensitivity of the angular speed sensor is made up of a drive circuit portion 71 and the detecting circuit portion 62.

The drive circuit portion 71 includes a function generator 73 which changes the detecting resonant frequency f of a drive signal to be applied to each of the first detecting electrode 70a and the second detecting electrode 70b.

Figure 12A:
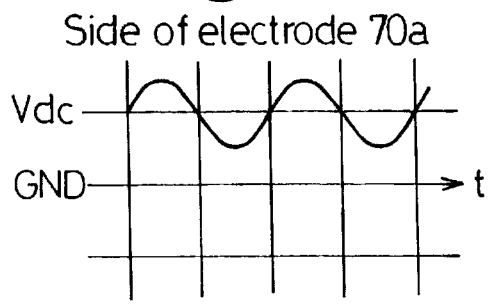
FIGS. 12a and 12b illustrate waveforms of drive signals to be fed to detecting electrodes, respectively, in the second embodiment.
Figure 12B:
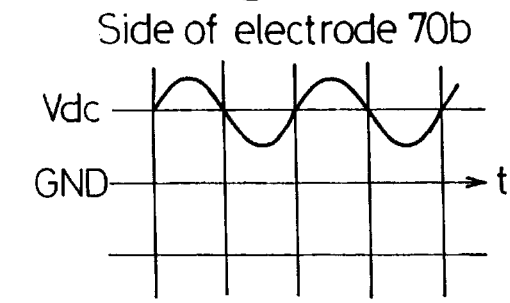

In detail, the function generator 73 applies the drive signal to be applied to each of the first detecting electrode 70a and the second detecting electrode 70b such that the detecting resonant frequency f of the drive signal is changed. As shown in FIGS. 12a and 12b, the voltage to be applied to each of the first detecting electrode 70a and the second detect electrode 70b is a combination of DC and DC voltages which is indicated by Vdc+Vac sin ($2\pi ft$) [V], where Vdc, Vac, and f are the DC voltage, the AC voltage and the detecting resonant frequency.

The drive circuit portion 71 having the aforementioned configuration drives the detecting frame 12 to vibrate in they-direction at the detecting resonant frequency. The generated signal can be monitored at terminal A.

In addition, similar to the first embodiment, the differential amplifier 67 of the detecting circuit portion 62 deletes the noises which are superposed on the angular speed detecting electrodes 15a and 15b which result from the application of the drive signals to the respective detecting electrodes 70a and 70b, thereby generating the differentiated amplified signal. This signal can be monitored at terminal B. Similarly, determining the frequency when a phase difference of $\pi/2$ appears between the signal at the terminal A and the signal at the terminal B makes it possible to detect the detecting side resonant frequency fs and the corresponding Q-value.

As apparent from the aforementioned detailed explanation, the present embodiment offers advantages similar to the foregoing advantages (1), (2), and (3) of the first embodiment.

Figure 13A:
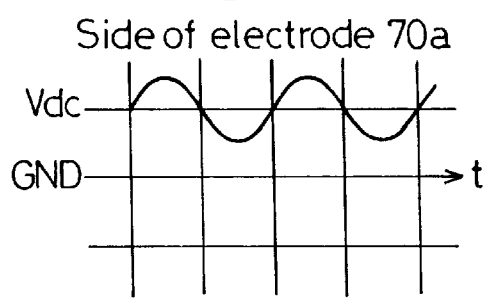
FIGS. 13a and 13b illustrate alternate waveforms of the drive signals to be fed to the detecting electrodes, respectively, in the second embodiment.
Figure 13B:
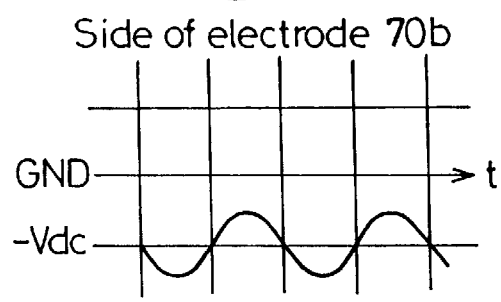

As shown in FIG. 13a, the signal to be applied to the first detecting electrode 16a can be a combination of DC and AC voltages which is indicated by Vdc+Vacsin ($2\pi ft$) [V] and, as shown in FIG. 13b, the signal to be applied to the second detecting electrode 16b can be a combination of DC and AC voltages which is indicated by −Vdc+Vacsin ($2\pi ft$) [V]. In this case, the differential amplifier 47 deletes noises which are superposed on the angular speed detect electrodes 70a and 70b resulting from the drive signal applied to the first detecting electrode 70a and the second detecting electrode 70b. Similarly, detecting the frequency when the phase difference between signals at the respective terminals A and B makes it possible to detect the detecting side resonant frequency fs [Hz] and the corresponding Q-value.

Figure 14A:
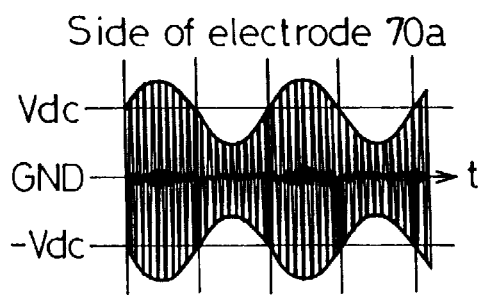
FIGS. 14a and 14b illustrate alternate waveforms of the drive signals to be fed to the detecting electrodes, respectively, in the second embodiment.
Figure 14B:
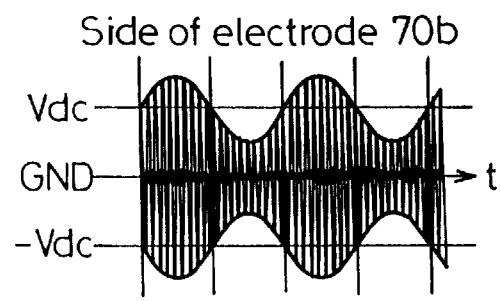

As shown in FIG. 14a, the signal to be applied to the first detecting electrode 16a can be an AC voltage which results from an AM modulation of a DC voltage and a high frequency AC voltage at a vicinity of a resonant point and which is indicated by Vdc+Vaccos ($2\pi ft+\theta 1+\pi$) Vacsin ($2\pi fht+\theta 2$) [V] and, as shown in FIG. 14b, the signal to be applied to the second detecting electrode 16b can be an AC voltage which results from an AM modulation of a DC voltage and a high frequency AC voltage at a vicinity of a resonant point and which is indicated by Vdc+Vaccos ($2\pi ft+\theta 1+\pi$) Vacsin ($2\pi fht+\theta 3$)[V], where f is the modulated frequency, fh is the frequency of carrier wave (high frequency wave), $\theta 1$ is a given constant, $\theta 2$ is a given constant, and $\theta 3$ is a given constant. In this case, deleting high frequency noises superposed on the respective angular detecting electrodes 70a and 70b with a low pass filter makes it possible to detect, with higher accuracy, the detecting side resonant frequency fs [Hz] and the corresponding Q-value.

Figure 15A:
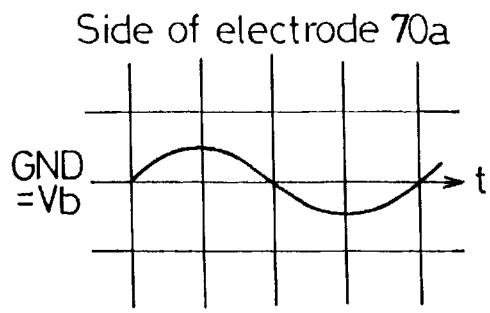
FIGS. 15a and 15b illustrate alternate waveforms of the drive signals to be fed to the detecting electrodes, respectively, in the second embodiment.
Figure 15B:
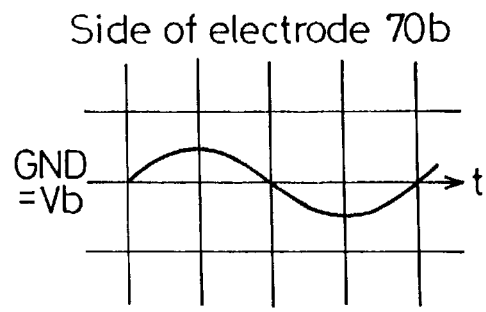

Moreover, as shown in FIG. 15a, the signal to be applied to the first detecting electrode 16a can be a set of DC voltage and an AC voltage having half of a forecasted detection resonant frequency which is indicated by Vb+Vasin ($2\pi(1/2)ft$) [V] and, as shown in FIG. 15b, the signal to be applied to the second detecting electrode 16b can be a combination of DC voltage and an AC voltage having half of a forecasted detection resonant frequency. In this case, deleting high frequency noises superposed on the respective angular detecting electrodes 70a and 70b with a low pass filter makes it possible to detect, with higher accuracy, the detecting side resonant frequency fs [Hz] and the corresponding Q-value.

It is to be noted the aforementioned embodiments are not restrictive and therefore the following modifications are available.

Figure 16:
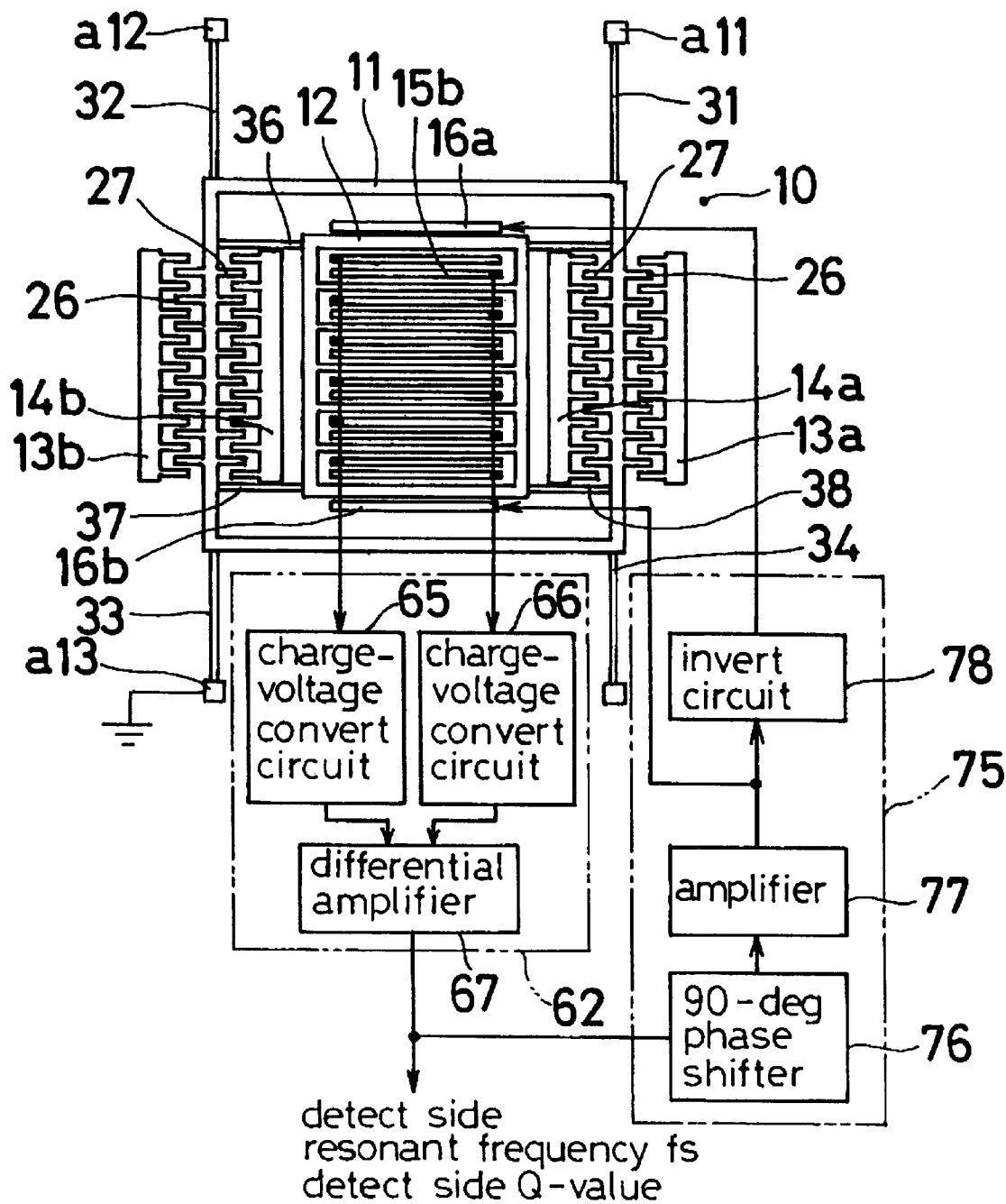
FIG. 16 illustrates a block diagram of an angular speed sensor device in accordance with a modification of the first embodiment of the present invention with an outline mode as to how to detect a detecting side resonant frequency and the corresponding Q-value in this modification.

Instead of the detection device of the first embodiment, a detection device shown in FIG. 16 can be employed. In detail, this detecting device includes the detecting circuit device 62 and a drive circuit portion 75. The drive circuit portion 75 is made up of a phase shifter 76, an amplifier 77, and an inverting circuit 78. The phase shifter 76, which is electrically coupled to the differential amplifier 67, shifts the differentially amplified signal issued therefrom by substantially $\pi/2$, whereby the phase of the loop is made $2n\pi$ (n: natural number) which is constituted by the first detecting electrode 16a, the second detecting electrode 16b, the angular speed detecting electrodes 15a and 15b, the detecting circuit portion 62, the drive circuit portion 75, and other components.

The amplifier 77 is coupled to the phase shifter and amplifies the differentially amplified signal which is applied thereto so as make the gain of the loop larger than 1 which is to constituted by the first detecting electrode 16a, the second detecting electrode 16b, the angular speed detecting electrodes 15a and 15b, the detecting circuit portion 62, the drive circuit portion 75, and other components.

The signal amplified by the amplifier 77 is applied to the second detecting electrode 16b, while the signal amplified at the amplifier 77 is, after being inverted by the inverting circuit 78, applied to the first detecting electrode 16a. In brief, the drive circuit portion 75 applies drive signals which are similar to those in FIG. 4 to the first detecting electrode 16a and the second detecting electrode 16b, respectively.

The drive circuit portion 75 having such a configuration drives the detecting frame 12 to vibrate (by self-excited oscillation) at the resonant frequency fs [Hz]. On the basis of the resulting output signal issued from the differential amplifier 67, the detecting side resonant frequency fs [Hz] and the corresponding Q-value are deterined.

It is to be noted that the drive circuit portion 75 can be designed to apply drive signals to the first detecting electrode 16a and the second detecting electrode 16b, respectively, similar to the signals in FIGS. 5a and 5b or FIGS. 6a and 6b.

Figure 17:
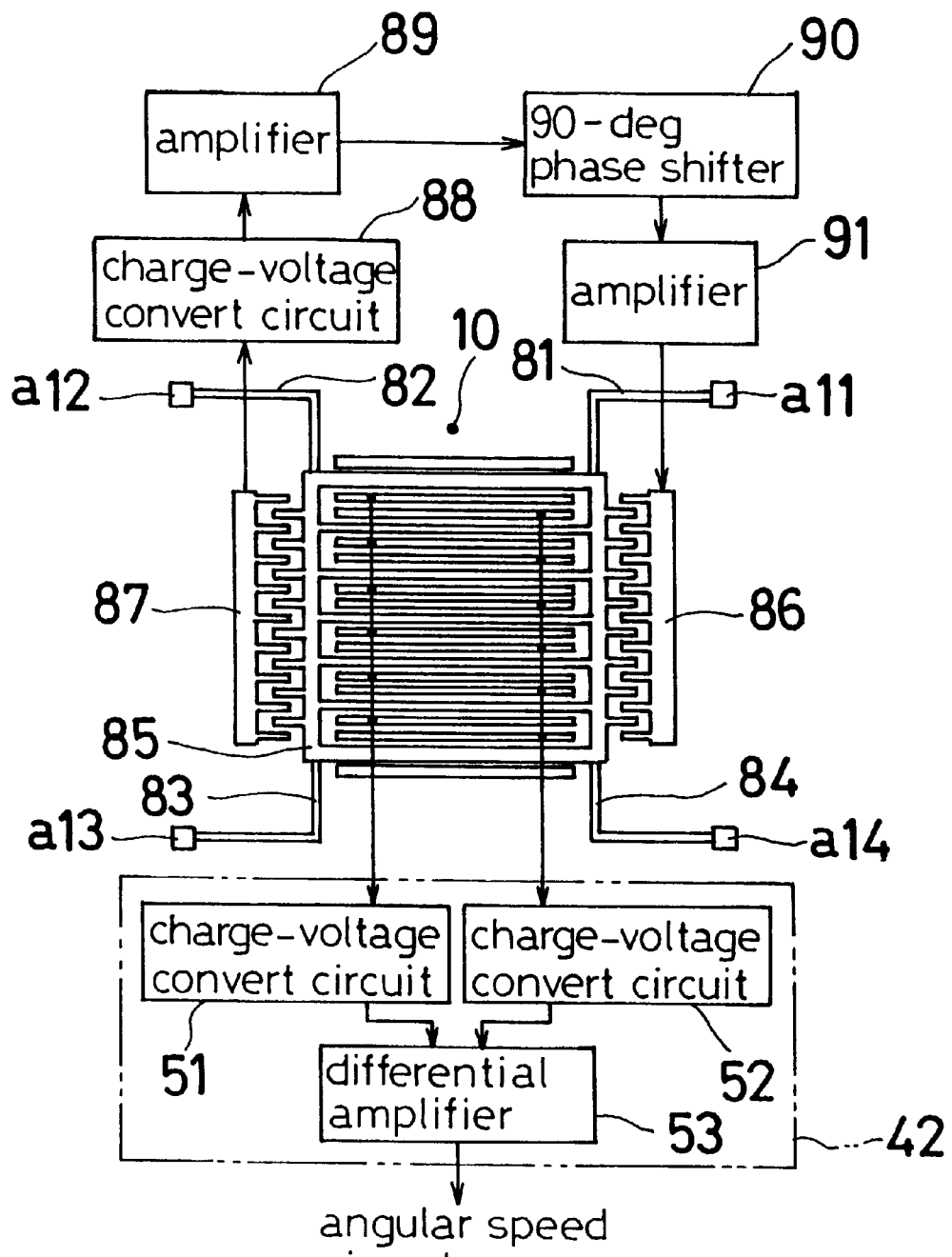
FIGS. 17 and 18 illustrate angular speed sensor devices each of which is a modification of the angular speed sensor device according to the first embodiment of the present invention.

In the foregoing first embodiment, the angular speed sensor device is made up of the drive frame 11 which is supported by the x-direction flexible beams 31, 32, 33, and 34 and the detecting frame 12 which is supported by the y-direction flexible relative beams 35, 36, 37, and 38. To the contrary, as shown in FIG. 17, an angular speed sensor device is possible which is made up of only a detect frame 85 which is supported by flexible beams 81, 82, 83, and 84 which are flexible in the x-and-y-directions. In such a structure, for example, at the right side in FIG. 17 and the left side in FIG. 17, there are provided a drive electrode 86 and a drive detecting electrode 87, respectively. Similar to the first embodiment, between the drive electrode 86 and the drive detecting electrode 87, there is interposed a series connection of a charge-voltage convert circuit 88, an amplifier 89, a phase shifter 90, and an amplifier 91. In this structure, the detecting frame 85 is driven to vibrate in the x-direction at the drive side resonant frequency fd [Hz]. Employing this concept makes the structure of the angular speed sensor device simpler.

Figure 18:
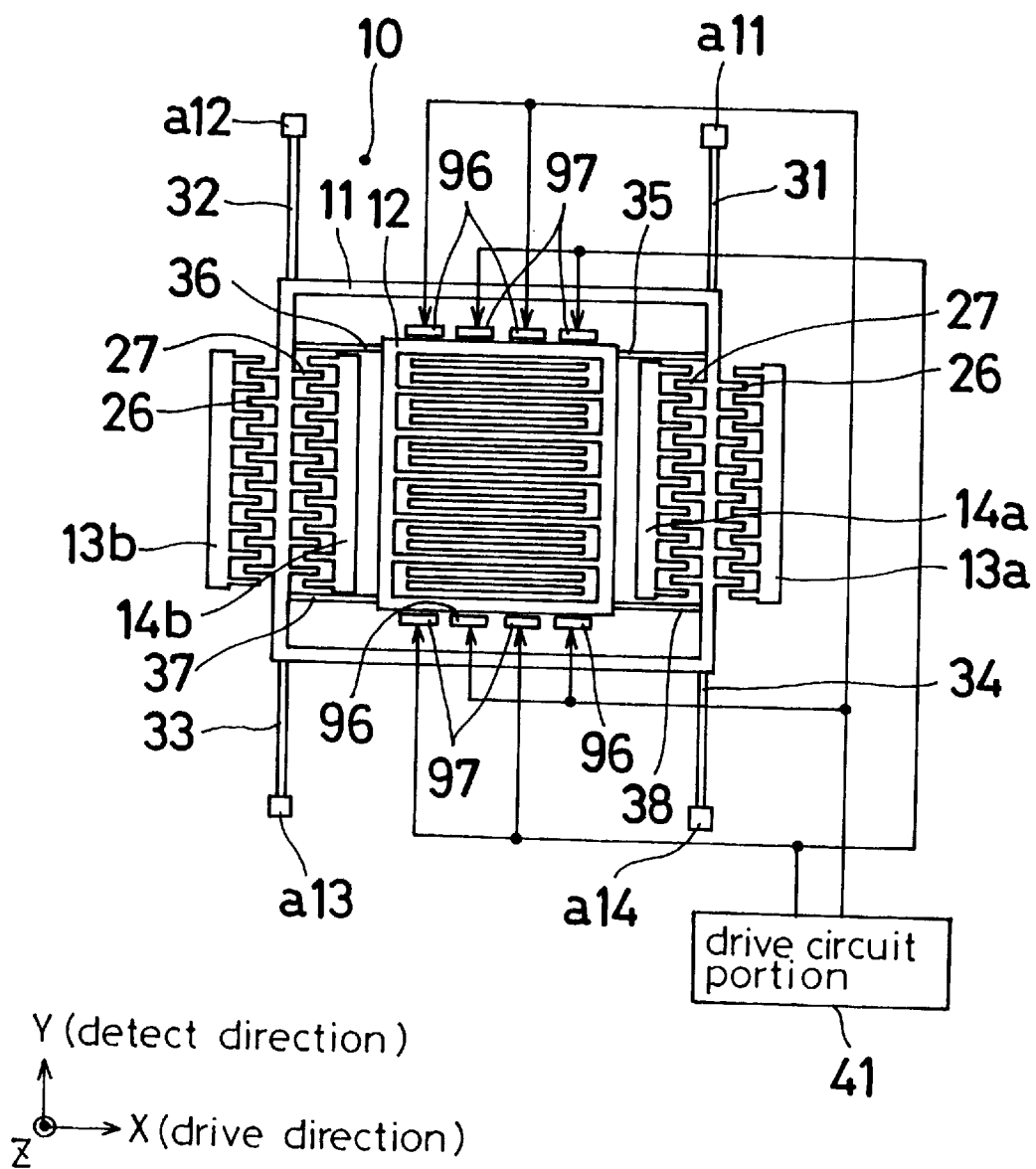

In the first embodiment, at the upper and lower sides in FIG. 1, there is provided the singular first detecting electrode 16a and the singular second detecting electrode 16b, respectively. To the contrary, as shown in FIG. 18, at the upper and lower sides, a first detecting electrode 97 and a second detecting electrode 96 are arranged alternately such that the total number of the electrodes is four in the x-direction, each of the first detecting electrodes 97 and each of the second electrodes 96 are made to be applied with respective drive signals, which makes it possible to establish equivalent voltage application and noise superpose on the angular speed detecting electrodes 15a and 15b. Thus, the differential amplifier (see FIG. 3) of the detecting circuit portion 62 cancels the evenly superposed noises on the respective angular speed detecting electrodes 15a and 15b, thereby determining, with much accuracy, the detecting side resonant frequency fs [Hz] and the corresponding Q-value.

In addition, as mentioned above, in case of the plural first detecting electrodes 96 and the plural second detecting electrodes 97, in order to reduce the superposed noises on the respective angular speed detecting electrodes 97 and 96 as a whole, a plurality of drive signals which are different in, for example, amplitude can be applied to the respective first detecting electrodes 96 and second detecting electrodes 97.

Figure 19:
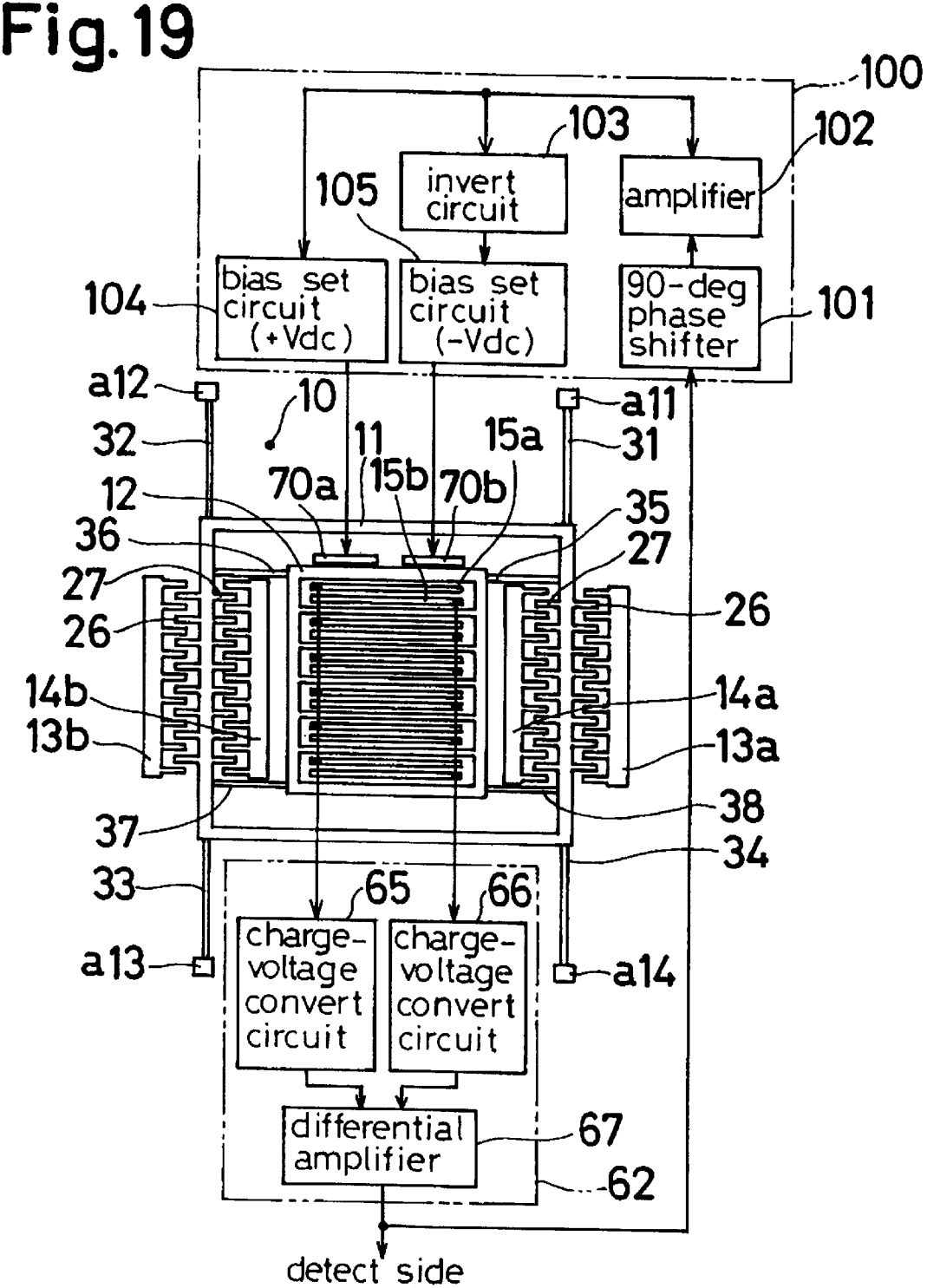
FIG. 19 illustrates a block diagram of an angular speed sensor device in accordance with a modification of the first embodiment of the present invention with an outline mode as to how to detect a detecting side resonant frequency and the corresponding Q-value in this modification.

Instead of the detecting device in the second embodiment, a detecting device shown in FIG. 19. In detail, this detecting device includes the detecting circuit device 62 and a drive circuit portion 100. The drive circuit portion 100 is made up of a phase shifter 101, an amplifier 102, an inverting circuit 103, and a pair of bias-set circuits 104 and 105.

The phase shifter 101, which is electrically coupled to the differential amplifier 67, shifts the differentially amplified signal issued therefrom by substantially $\pi/2$, whereby the phase of the loop is made $2n\pi$ (n: natural number) which is constituted by the first detecting electrode 70a, the second detecting electrode 70b, the angular speed detecting electrodes 15a and 15b, the detect circuit portion 62, the drive circuit portion 100, and other components.

The amplifier 102 is coupled to the phase shifter 101 and amplifies the differentially amplified signal which is shifted thereat so as make the gain of the loop larger than 1 which is constituted by the first detecting electrode 70a, the second detecting electrode 70b, the angular speed detecting electrodes 15a and 15b, the detecting circuit portion 62, the drive circuit portion 100, and other components.

The signal amplified by the amplifier 102 is, after being applied with a DC voltage of Vdc at the bias-set circuit 104, applied to the first detecting electrode 70a, while the signal amplified by the amplifier 77 is, after being applied by a DC voltage of −Vdc at the bias-set circuit 105 and successively being inverted at the inverting circuit 103, applied to the second detecting electrode 70b. In brief, the drive circuit portion 100 applies drive signals which are similar to those in FIG. 13, to the first detecting electrode 70a and the second detecting electrode 70b, respectively.

The drive circuit portion 100 having such a configuration drives the detecting frame 12 in the y-direction to vibrate at the resonant frequency fs [Hz]. On the basis of the resulting output signal issued from the differential amplifier 67, the detecting side resonant frequency fs [Hz] and the corresponding Q-value are determined.

It is to be noted that the drive circuit portion 100 can be designed to apply the drive signals to the first detecting electrode 70a and the second detecting electrode 70b, respectively, similar to the signals in FIG. 12.

Figure 20:
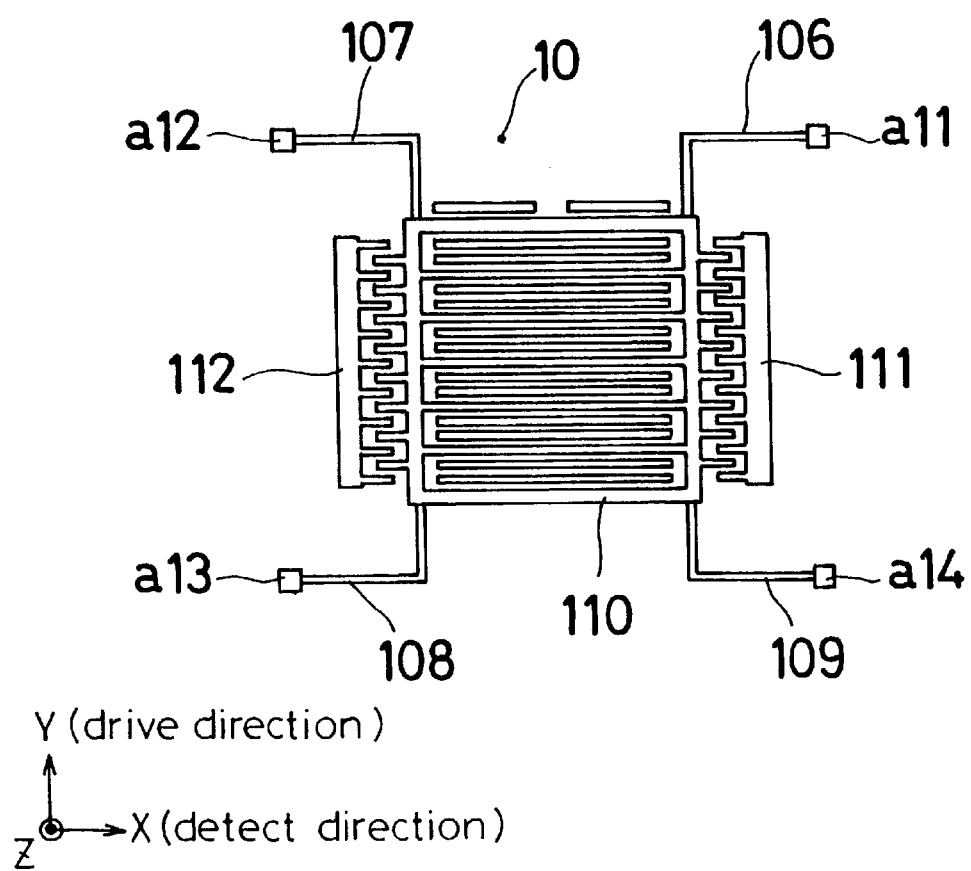
FIGS. 20 and 21 illustrate angular speed sensor devices, each of which is a modification of the angular speed sensor device, according to the second embodiment of the present invention.

In the foregoing second embodiment, the angular speed sensor device is made up of the drive frame 11 which is supported by the x-direction flexible beams 31, 32, 33, and 34 and the detecting frame 12 which is supported by the y-direction flexible relative beams 35, 36, 37, and 38. However, as shown in FIG. 20, an angular speed sensor device is possible which is made up of only a detecting frame 85 which is supported by flexible beams 106, 107, 108, and 107 which are flexible in the x-and-y-direction. In such a structure, for example, at the right side in FIG. 20 and the left side in FIG. 20 of a detecting frame 110, there are provided a drive electrode 111 and a drive detecting electrode 112, respectively. In this structure, the detecting frame 85 is driven to vibrate in the x-direction at the drive side resonant frequency fd [Hz]. Employing this concept makes the structure of the angular speed sensor device simpler.

Figure 21:
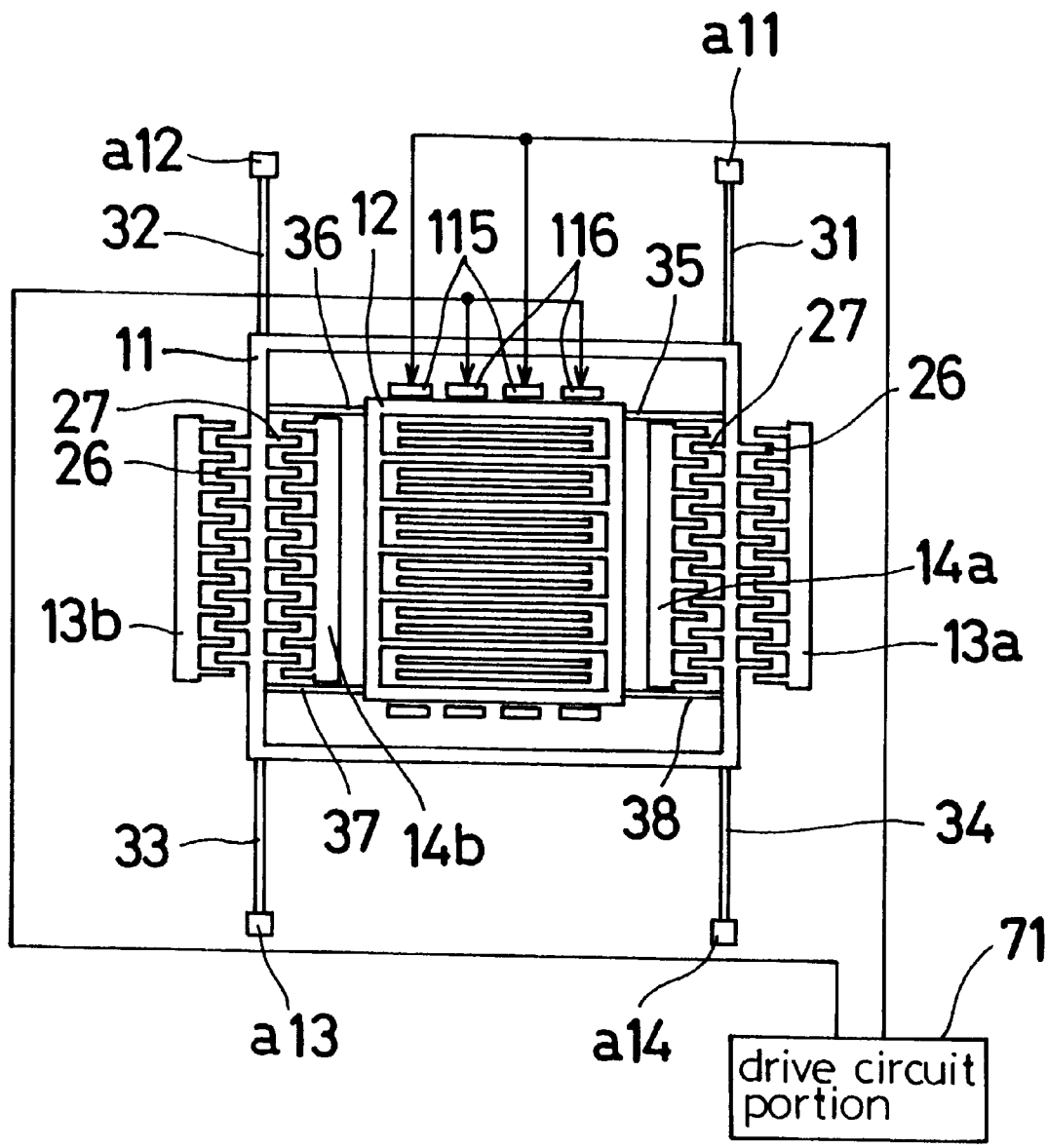

In the second embodiment of FIG. 11, there is provided a single first detecting electrode 70a and a single second detecting electrode 70b, respectively. However, as shown in FIG. 21, at the upper and lower sides, first detecting electrodes 115 and second detecting electrodes 116 are arranged alternately such that the total number of the electrodes is four in the x-direction and each of the first detecting electrodes 115 and each of the second electrodes 116 are applied with respective drive signals, which makes it possible to establish equivalent voltage application and noise superposed on the angular speed detect electrodes 15a and 15b. Thus, the differential amplifier (see FIG. 3) of the detecting circuit portion 62 cancels the evenly superposed noises on the respective angular speed detecting electrodes 15a and 15b, thereby determining, with much accuracy, the detecting side resonant frequency fs [Hz] and the corresponding Q-value.

In addition, as mentioned above, in case of the plural first detecting electrodes 115 and the plural second detect electrodes 116, in order to reduce the superposed noises on the respective angular speed detecting electrodes 15a and 15b as a whole, a plurality of drive signals which are different in, for example, amplitude can be applied to the respective first detecting electrodes 115 and the second detecting electrodes 116.

Instead of the plural detect electrodes 16a and 16b, 70a and 70b, 96 and 97, 115 and 116, a sole detecting electrode is possible so long as such an electrode can drive the detecting frame 12 in the y-direction.

Instead of making the electrodes 16a, 16b, 70a, 70b, 96, 97, 115, and 116 plate-shape to extend in the x-direction, the electrodes 16a, 16b, 70a, 70b, 96, 97, 115, and 116 can be formed into a comb-configuration projecting to the respective detecting frames 12, 12, 85, 85, 110, and 110 such that the opposed portions are brought into comb-to-comb or loosely interlocked condition.

When a pair of the detecting electrodes 16a and 16b, 70a and 70b, 96 and 97, 115 and 116 are applied with the drive signals which are of opposed phases, a function generator with a single output terminal can be used by branching the single output terminal such that one of the branch terminals can be coupled to an inverting circuit. If a function with two output terminal is used, the two output terminals are only made to issue respective drive signals which are of opposite phases.

The foregoing driving structure for driving the drive frame 11 and the detecting frame 85 (110) in each embodiment is a mere example and therefore other modes can be employed.

Instead of the silicon substrate 10 as the raw material of the substrate, any one of Si, Ge, SiC, SixGe1-x, SixGeyCl-x-y each of which is in the state of any one of single crystal, polycrystal, and non-crystal can be used.

The structure of each of the angular speed sensor devices is a mere example and therefore other modes can be employed so long as they are of a structure for detecting an angular speed on the basis of the y-direction vibration.

The invention has thus been shown and described with reference to a specific embodiment, however, it should be understood that the invention is in no way limited to the details of the illustrates structures but changes and modifications may be made without departing from the scope of the appended claims.

APPENDIX $$\Delta y = A_s \cdot F_c / k_s \quad (1)$$

$$A_s = \frac{1}{\sqrt{\left\{1-\left(\frac{fd}{fs}\right)^2\right\}^2 + \left\{\frac{1}{Q}\cdot\frac{fd}{fs}\right\}^2}} \quad (2)$$

$$k_s = 4\pi^2 \cdot fs^2 \cdot ms \quad (3)$$

$$F_c = 2ms \cdot vd \cdot \Omega \quad (4)$$

$$\Delta y = \frac{1}{\sqrt{\left\{1-\left(\frac{fd}{fs}\right)^2\right\}^2 + \left\{\frac{1}{Q}\cdot\frac{fd}{fs}\right\}^2}} \cdot \frac{vd}{2\pi^2 \cdot fs^2} \cdot \Omega \quad (5)$$

What is claimed is:

1. An angular speed sensor device comprising:
   an oscillator mounted on a substrate in a floating mode and brought into vibration in the y-direction in response to Coriolis force which results when the oscillator is supplied with an angular speed about the z-axis while the oscillator is being driven in the x-direction;

detecting means for detecting a y-direction displacement signal of the oscillator; and a detecting electrode device driving the oscillator in the y-direction when a drive signal is applied thereto which varies an electrostatic attraction between the oscillator and the detecting electrode device, wherein a resonant frequency of the oscillator in the y-direction and the corresponding Q-value are determined on the basis of the drive signal and the displacement signal.

2. An angular speed sensor device as set forth in claim 1, wherein the detecting electrode device is made up of a first detecting electrode placed at one y-direction side of the oscillator and a second detecting electrode placed at the other y-direction side of the oscillator.

3. An angular speed sensor device as set forth in claim 1, wherein the detecting electrode device is made up of a first detecting electrode and a second detecting electrode which are placed at one y-direction side of the oscillator and which are adjacent each other and extend in the x-direction.

4. An angular speed sensor device as set forth in claim 1, wherein the detecting electrode device is made up of a first detecting electrode and a second detecting electrode which are placed at one y-direction side of the oscillator and which are arranged alternately in the x-direction.

5. An angular speed sensor device as set forth in claim 1, wherein the detecting means includes an angular speed detecting electrode which detects a variable electrostatic capacitance between the oscillator and the angular speed detecting electrode as the displacement signal, wherein a distance in the y-direction between the detecting electrode device and the oscillator is set to be shorter than a distance in the y-direction between the angular speed detecting electrode and the oscillator while the oscillator is at rest.

6. An angular speed sensor device as set forth in claim 2, wherein the detecting means includes first and second angular speed detecting electrodes, each of which detects a variable electrostatic capacitance between the oscillator and the angular speed detecting electrode as a displacement signal, wherein the detecting means includes a differential amplifier for differentially amplifying the detected displacement signal.

7. An angular speed sensor device as set forth in claim 3, wherein the detecting means includes first and second angular speed detecting electrodes, each of which detects a variable electrostatic capacitance between the oscillator and the angular speed detecting electrode as a displacement signal, wherein the detecting means includes a differential amplifier for differentially amplifying the detected displacement signal.

* * * * *